United States Patent [19]
Bailey et al.

[11] 3,887,918
[45] June 3, 1975

[54] MULTI-LEVEL DIGITAL COINCIDENCE DETECTION

[75] Inventors: John S. Bailey, Woodland Hills; David E. Hammers, Los Angeles, both of Calif.

[73] Assignee: International Telephone and Telegraph Corporation, New York, N.Y.

[22] Filed: May 9, 1973

[21] Appl. No.: 358,617

[52] U.S. Cl. .... 343/17.2 R; 343/5 DP; 343/6.8 LC; 343/17.2 PC; 343/100 CL
[51] Int. Cl. .............................................. G01s 7/30
[58] Field of Search ....... 343/5 DP, 6.8 LC, 17.2 R, 343/17.2 PC, 100 CL

[56] References Cited
UNITED STATES PATENTS

| | | | |
|---|---|---|---|
| 3,167,738 | 1/1965 | Westerfield | 343/5 DP |
| 3,341,845 | 9/1967 | Deman | 343/6.8 LC X |
| 3,427,617 | 2/1969 | Richman | 343/17.2 R |
| 3,480,956 | 11/1969 | Sanderson | 343/17.2 R X |
| 3,680,100 | 7/1972 | Woerrlein | 343/100 CL X |
| 3,689,750 | 9/1972 | Esser | 343/5 DP X |

Primary Examiner—Malcolm F. Hubler
Attorney, Agent, or Firm—William T. O'Neil

[57] ABSTRACT

A multi-level coincidence detector for use in a radar system which transmits relatively long pulses each divided into a plurality of successive subpulses, each discretely digitally phase coded. In order to effect pulse compression on reception, the transmitted codes are stored, and received bipolar video is hard limited and examined by a delay-line or shift register coincidence detector arrangement against the stored code in groups, each containing a fraction of the subpulses of the total transmitted pulse duration. Each of the detectors at this first level coincidence detection operates to provide a first or second digital output level based on affirmative comparison of received vs. stored codes during that group (fraction of the subpulses). A second level coincidence detector examines the output of each coincidence detector of this first level and provides a digital output, for example, corresponding to presence of signal when a predetermined fraction of the first level coincidence detectors have indicated presence of signal.

6 Claims, 2 Drawing Figures

MULTI-LEVEL DIGITAL COINCIDENCE DETECTION

BACKGROUND OF THE INVENTION

1. Field of the Invention

The invention relates to pulse signal detection and more particularly, to digital coincidence detection of the type frequently used in pseudo-noise radar systems or others employing pulse compression receiving systems.

2. Description of the Prior Art

In the prior art, the various techniques employed in effecting pulse compression in radar systems are well understood. By increasing the average power of a pulsed radar transmitter through transmission of relatively long pulses produces high average transmitted power as compared to a short transmitted pulse systems, for the same peak power capability. In order to recover the capability of range resolution, which is inherently lost in long transmitted pulse systems, various pulse compression schemes have been devised. Each pulse compression scheme corresponds to a particular type of transmitted pulse format or program. Among the known systems are the frequency modulated pulse (chirp) with dispersive delay line receiving means, time-frequency coded waveforms, and subdivided-pulse phase coded transmitted waveforms. In the latter, the transmitted pulse is broken into a plurality of subpulses, each discretely phase coded in accordance with a predetermined pattern or program. This type of pulse compression system is particularly well adapted to digital instrumentation, since the individual subpulses may be binary coded, that is, transmitted in either a first or second (usually in 180° phase relationship) phase condition. Fundamentally, it may be said that all pulse compression systems involve receiving systems generically describable as "matched filter" systems.

A description of state-of-the-art pulse compression radar, particularly involving the use of phase-coded waveforms, is contained in the book entitled "Radar Handbook" by Merrill I. Skolnik, a McGraw Hill book 1970. Chapter 20 of that particular text is devoted entirely to pulse-compression radar and Section 20.5 entitled Phase Coded Waveforms, is particularly pertinent as prior art.

In the aforementioned textbook reference, the so-called Barker or optimum codes are discussed, as are the so-called pseudorandom sequences. The significance of the so-called Barker code in terms of range sidelobe performance is given and the limitations of the so-called pseudorandom sequences are presented.

The implementation of a pseudorandom system in strictly analog instrumentation is increasingly difficult as the number of subpulses in the transmitted pulse is increased. In such an analog system, post detection integration is obtained by summing the envelope detected video from all the subpulses intercepting the target. Since, in a scanning radar system, there is no a-priori knowledge of a target's position, in relationship to a target that encompasses all of the subpulse hits on a target, it is necessary to move the spacial center of gravity of the receiver gate (equal to the transmitted pulse duration) each time a new pulse is transmitted. This requires the storage of N minus 1 previous pulses for a gate encompassing N potential subpulses on target.

The state of the prior art in connection with coincidence detection for pulse compression systems is limited by the inherent storage requirements and by the difficulty of instrumenting long pseudorandom sequences.

The manner in which the disadvantages or limitations of the prior art are addressed to produce the improvements and advantages of the present invention will be evident to the skilled reader as this description proceeds.

SUMMARY OF THE INVENTION

In consideration of the disadvantages and limitations of the prior art, a system has been developed for retaining the coherence property afforded by hard limiting a bi-polar video signal to obtain coherent integration of the hits on a target in a system having a matched filter. The phase-coded pseudorandom sequence type of pulse compression radar provides one application for the present invention.

It is known that hard limiting of bi-polar video allows "nearly" coherent integration of the hits on a target. The digital encoding of the said bi-polar video is effected by hard limiting of the said bi-polar video, so that there are only first and second amplitude levels representative of the two digital values in such a system. The bi-polar video may be obtained, for example, through the use of a phase detector similar to that used in Doppler MTI systems.

After hard limiting, received video is in effect digitally encoded and may be passed through a delay line or shift register which is discretely tapped at intervals, the number of taps corresponding to the number of subpulses and each of a predetermined number of first level coincidence detection groups.

Suppose, for example, that the number of subpulses in a transmitted pulse is identified as N. Assume that G is the number of the said groups of said pulses, $\tau$ is the duration of the subpulse and the delay line or shift register receiving the hard limiting video has $N/\tau$ taps. If there are G of the said groups at the first level coincidence detection, then each first level coincidence detector circuit receives a successive group of N/G successive taps. Each of these first level coincidence detectors would perform much as described for a matched filter (see FIG. 19, Page 20–21 of the aforementioned Radar Handbook textbook reference).

If each of the G first level coincidence detectors are set to provide a one bit digital output in a first condition when a predetermined number of successes, within the one-to-one comparisons being performed within each of said coincidence detectors, is achieved. The said one-to-one comparison is provided against a stored replica of the transmitted code in corresponding digital form. If the first of said first level coincidence detector circuits gives an affirmative output based on some predetermined percentage of successful individual subpulse comparisons, identified as M 1 out of N 1, the second provides an affirmative output when M 2 successes out of N2 are achieved and so on down the line, throughout the first level of coincidence detection, the outputs of these first level coincidence detectors may then be provided to a similar second level coincidence detector having a single affirmative or negative one bit digital output. An affirmative output from the said second digital level could be thought of as occurring when $G_1$ (out of G) affirmative inputs were identified in first level coincidence detector outputs.

The foregoing system establishes a false-alarm rate and probability-of-detection that is subject to classical analysis using Neyman Pearson detector theory. The coincidence multi-level processor allows a significant extension of N and/or reduction of $\tau$, as compared to the prior art. The advantages of a long pseudorandom transmitted code may thus be achieved in terms of uniform spectrum, small and relatively constant range sidelobes, and the elimination of amplitude as a factor in establishing the false-alarm rate (eliminated by the hard limiting process). The hard limiting operates equivalent to a one-bit analog-to-digital converter in the system of the invention.

DESCRIPTION OF THE PREFERRED EMBODIMENTS

Figure 1:
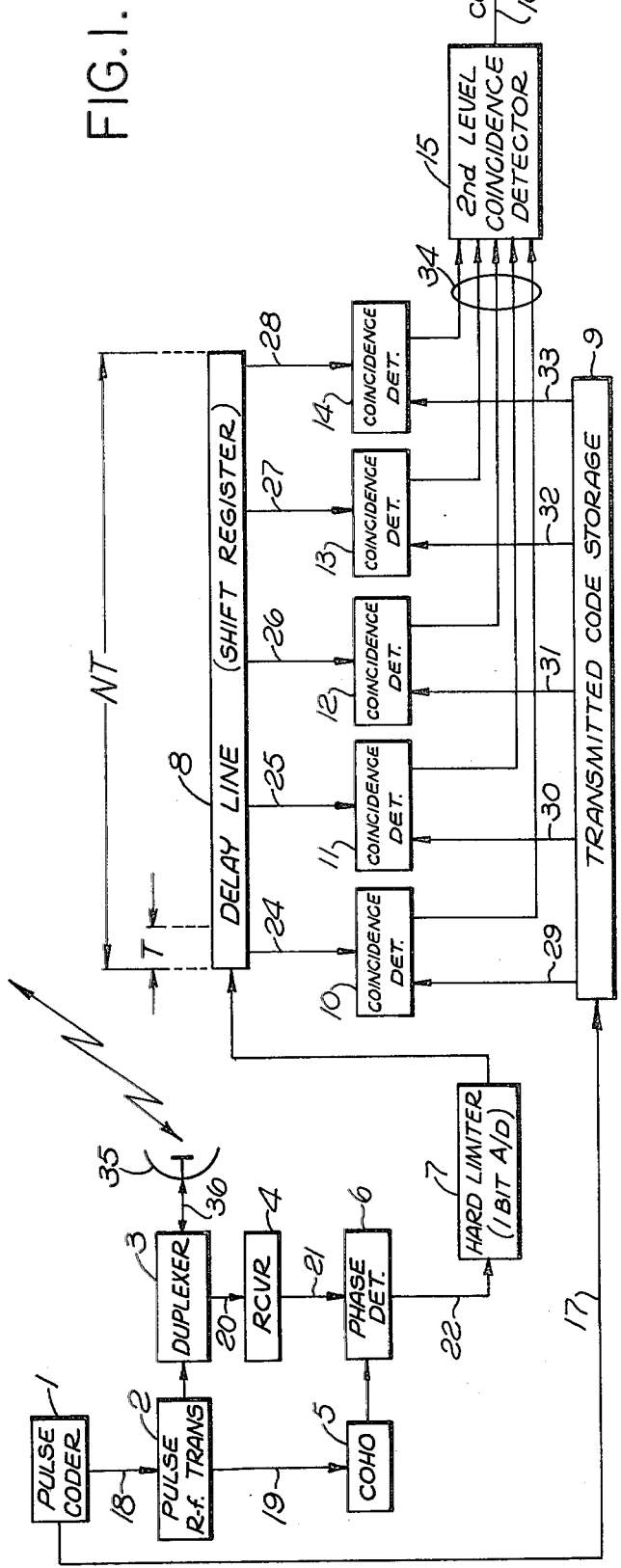
FIG. 1 is a block diagram of a typical radar system employing the present invention in a pulse compression arrangement.

Referring now to FIG. 1, the elements of a complete Radar system employing the present invention are illustrated.

In general, a pulse coder, (pulse code generator) 1, is used to provide the discretely phase-coded modulation pulses which are supplied via lead 18 to a pulse transmitter 2. As is well known in connection with MTI systems, a "coho" or coherent oscillator 5, is controlled via lead 19 from the pulse transmitter 2, to "remember" the transmitted RF phase and frequency as a reference for the phase detector 6. The pseudonoise coded output of the transmitter 2 passes through a duplexer 3 and via lead 36 to an antenna 35 from which it is transmitted. Echo signal reflections are received in the well known way by antenna 35, passed back via lead 36, duplexer 3 (via lead 20) and then to receiver 4. The output of receiver 4, on lead 21, has been down-converted to a lower frequency realm (IF range, for example). The phase detector 6 is then in a position to provide a bi-polar signal output on lead 22, wherein each received subpulse is one of either of two polarities, depending upon its phase with respect to that of coho 5. This process, well understood per se, is referred to as coherent detection.

The hard-limiter 7 effectively removes all amplitude variations, and, in effect, provides an output which is either + or − (0 or 1) during the time of each receive subpulse, and therefore, the hard-limiter 7 may be referred to as a one bit analog-to-digital converter.

The device 8, which generically is a delay line or delay device, is preferably a shift register, since the aforementioned output of the hard-limiter 7 is essentially a digital sequence, responds at an input to the output of hard-limiter 7. Actually, the device 8 has a plurality of taps equal in number to the number of subpulses in each transmitted sequence. Each of these subpulses is $\tau$ in duration and the total duration of the sequence is therefore $N\tau$ which is the aforementioned number of subpulses in a transmitted sequence. Accordingly, the number of taps along the device 8 is N, and it is to be understood that each of the output lines 24, 25, 26, 27 and 28 is in fact a multi-lead package and comprises a predetermined fraction of the total number of taps N. If the taps of the device 8 are divided such that each of the coincidence circuits 10, 11, 12, 13 and 14 receives a fraction equal to the square root of N of the said taps, then the operation of the device would be as will be described in connection with FIG. 2, hereinafter.

It will now be realized that each of the leads 24, 25, 26, 27 and 28 then includes $\sqrt{N}$ discrete leads. The same may be said of each of the leads 29, 30, 31, 32 and 33. Still further, each of the coincidence detectors 11, 12, 13 and 14 comprises circuitry to make $\sqrt{N}$ comparisons. The logic circuitry of each of these coincidence detectors is thus capable of providing an output into the lead package 34 whenever a predetermined fraction of these $\sqrt{N}$ comparisons is affirmative. Such a process is of itself well understood in the prior art in connection with correlation circuits. The detailed logic circuitry necessary to implement the coincidence detectors 10 through 14 is well understood in the art.

It will be realized that, as the predetermined transmitted code from coder 1, is emplaced in the transmitted code storage 9 via lead 17, the received data is shifted down the device 8 until these correlations are effected on a one-to-one basis between received and stored code subpulses throughout the sequence. The second level coincidence detector 15 is another circuit equivalent to one of the detectors 10 through 14. That is, it responds with an affirmative output on 16 whenever some predetermined fraction of the lead package 34 signals are affirmative. The circuits in the first level coincidence detectors 10 through 14 are comprised of exclusive OR gates, to use logic design terminology. The same may be said of the second level coincidence detector 15.

Figure 2:
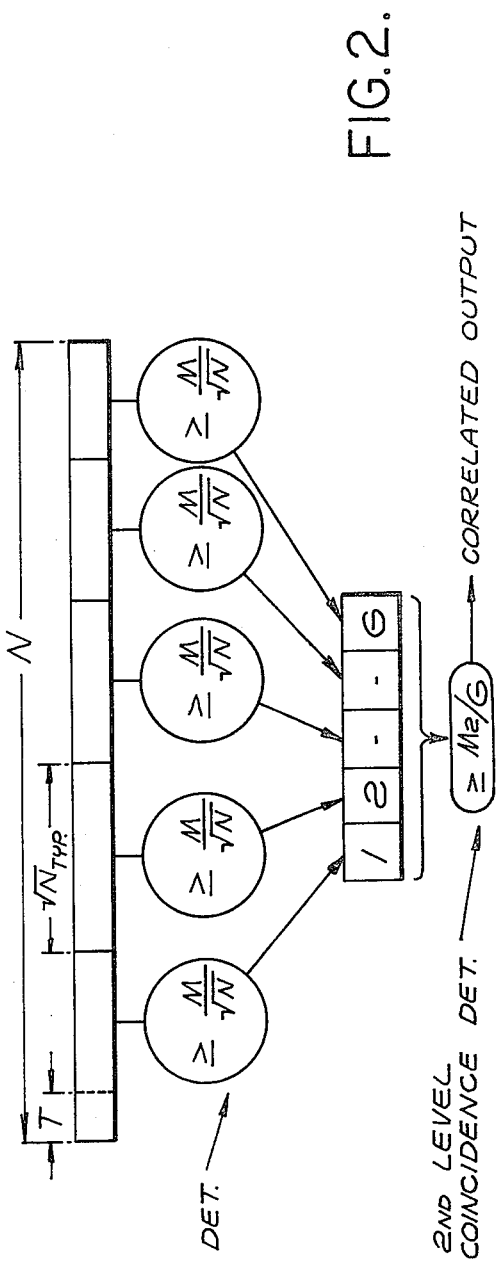
FIG. 2 illustrates in more detail the operation of the first and second level coincidence detection logic of the present invention.

Referring now to FIG. 2, a logical flow diagram illustrating the operation of FIG. 1, is presented. The total number of subpulses N in each transmitted pulse is shown divided into increments of $\sqrt{N}$. If M is the number of affirmative comparisons between the individual subpulses of each of the said subgroups from the device 8 viz-a-viz, the storage device 9, then each of the five first coincidence detectors illustrated in FIG. 2, provides an affirmative output whenever at least M out of $\sqrt{N}$ such affirmative comparisons are effected on a one-to-one basis. If there are G outputs from these first level coincidence detectors, as illustrated in FIG. 2, and if M2 out of G is the fraction of the G first level coincidence detector outputs required to be affirmative in order to provide an affirmative output at the correlated output terminal of the second level coincidence detector, it will be seen that a two-level correlation arrangement has been provided.

It will be seen that the second level coincidence detector does not operate to produce a direct comparison between received and stored subpulse groups. It will also be seen that the total amount of storage required is reduced as compared to an elongated single level system required to deal with an extended pulse, of the pseudonoise type, for example, containing many subpulses $\tau$.

In an analog system, post-detection integration is obtained by summing the envelope detected video from each pulse intersecting a given target. Digital coincidence detection performs this same operation digitally after feeding through a one bit analog-to-digital converter. The threshold level of the said analog-to-digital converter and the output threshold level of the subsequent summer establish a false alarm rate and probability-of-detection that is amenable to classical analysis using Neyman-Pearson detector theory. Since, in a scanning radar system there is no a-priori knowledge of a target's position in relationship to a gate that encompasses all of the hits on a target, it is necessary to move the spacial center of gravity of the said GATE, each time a new pulse is generated, provided of course, the target has moved in that time. This in turn requires the storage of N-1 previous pulses for a GATE encompassing N potential hits on the given target. In view of the foregoing discussion, which applies to the generalized prior art digital coincidence detection art, it will be realized that the reduction in storage afforded in a tracking Radar system through use of the combination of the present invention for two levels that equally partition the hits on target, is given by $\sqrt{N} + 1/2$.

It is also known that hard limiting of bi-polar video allows "nearly" coherent integration of the hits on a target in a system with a matched filter, i.e., including the type of system including the arrangement of FIGS. 1 and 2. The present invention retains this coherence property through its multi-level processing arrangement.

It is known that, for large compression ratios (i.e., N is large) and short code granularity ($\tau$ is small), it becomes difficult, if not impossible, to digitally realize the overall tracking gate. Moreover, range sidelobes and other considerations become a factor in single level prior art coincidence detection arrangements. For those reasons, the so-called Barker code in which a 13 to 1 range sidelobe discrimination is obtained, has been regarded as optimum for the ordinary application. In view of the fact that the longest pulse possible is frequently desired, for example, in pseudonoise systems, it will be seen that the arrangement of the present invention facilitates the use of relatively long code words in a device of simple implementation. The device of the invention is also obviously flexible in respect to the use of different code configurations.

It should also be noted that the device of the present invention operates in real time, as is required for range detection. Therefore, the correlated output 16 provides an output every $\tau$ seconds, either affirmative or passive (the latter corresponding to a negative decision).

Various modifications and adaptations of the arrangement of the present invention will suggest themselves to those skilled in this art, once the structure and operation are understood. For just one example, the concept could be made applicable to a three-level coincidence detection arrangement through extension of the concept to one more level.

What is claimed is:

1. In a radar system having means for transmitting relatively long pulses each subdivided into a plurality of N substantially equal duration successive subpulses each coded in first or second radio frequency phase condition according to a predetermined program, and pulse echo receiving means, pulse compression means comprising: means responsive to said transmitting means for storing the code of said transmitted pulses as a series of one-bit digital codes corresponding discretely to said subpulses; phase detection means responsive to said receiving means for producing a sequence of bi-polar video pulses the polarities of which correspond discretely to said first and second radio frequency phase conditions; means responsive to said phase detection means for converting said video polarities to a one-bit digital code corresponding to each of said subpulses at the output thereof; delay means responsive to said one-bit code, said delay means having a transmission time at least as long as said relatively long transmitted pulses, said delay means having a number of taps corresponding to the number of said successive subpulses, said taps being spaced by a time substantially equal to the duration of one of said increments; a first level correlator comprising a first bank of G coincidence detectors, said coincidence detectors each connected to correlate a different predetermined fraction of the plurality of N subpulses of said transmitted pulse against the corresponding fraction of said subpulses in said means for storing the code of said transmitted pulses, said coincidence detectors connecting between corresponding groups of taps on said delay means and said means for storing the code of said transmitted pulses, said coincidence detectors each producing a single output providing a one bit code representing correlation success, or the lack of it, within the corresponding detector; and a second level correlator comprising a second bank of coincidence detectors responsive to the outputs of said first level correlator for producing a one bit output representative of at least two successes in the outputs of said G coincidence detectors.

2. Apparatus according to claim 1 in which said transmitting means includes a pulse coder for encoding the RF phase of said subpulses discretely in either a first phase or a second phase, and said receiving means includes coherent detection means whereby received pulse envelopes are comprised of subpulses having amplitudes determined by said first phase or said second phase in the corresponding transmitted subpulses ahead of said hard limiter.

3. Apparatus according to claim 2 in which said second phase is shifted 180° RF with respect to said first phase.

4. In a radar system which includes means for transmitting and means for receiving pulse envelopes comprising a plurality of N subpulses discretely phase coded in accordance with a predetermined code pattern, the combination comprising: an analog-to-digital converter comprising a hard limiter responsive to said received pulse envelopes, said limiter providing the function of a one-bit analog-to-digital converter, whereby said N subpulses are reduced to signals of first or second condition; storage means connected to said transmitting means for storing said code of said transmitted pulse envelope subpulses between successive transmissions; delay means responsive to the output of said analog-to-digital converter, said delay means having a plurality of outputs delay spaced substantially one subpulse duration, the number of said delay means outputs equalling the number of said subpulses in each of said pulse envelopes; means comprising a plurality of G first coincidence detector circuits each responsive to a fraction of said delay means taps and a corresponding fraction of the subpulses of said transmitted code stored by said storage means, said first coincidence detector circuits being adapted to provide an affirmative output signal from the output of each of said G first coincidence detector whenever at least a predetermined number of subpulses from said delay means matches the code of the corresponding subpulses from said second means; and means comprising a second coincidence detector circuit responsive to said first coincidence detector outputs to provide an affirmative output only when at least two of said G first detector outputs are affirmative.

5. Apparatus according to claim 4 in which said G first coincidence detector circuits are each responsive to a fraction equal to N/G of said subpulses from said storage means.

6. Apparatus according to claim 5 in which said N/G fraction is the $\sqrt{N}$.

* * * * *